US010904972B2

(12) United States Patent
Chen et al.

(10) Patent No.: US 10,904,972 B2
(45) Date of Patent: Jan. 26, 2021

(54) RETROFIT LIGHT EMITTING DIODE, LED, TUBE FOR REDUCING AUDIBLE NOISE ORIGINATING FROM A HIGH FREQUENCY ELECTRONIC BALLAST

(71) Applicant: SIGNIFY HOLDING B.V., Eindhoven (NL)

(72) Inventors: Zhi Quan Chen, Shanghai (CN);
Xianhui Zhang, Shanghai (CN);
Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/607,471

(22) PCT Filed: Apr. 18, 2018

(86) PCT No.: PCT/EP2018/059843
§ 371 (c)(1),
(2) Date: Oct. 23, 2019

(87) PCT Pub. No.: WO2018/197286
PCT Pub. Date: Nov. 1, 2018

(65) Prior Publication Data
US 2020/0146123 A1  May 7, 2020

(30) Foreign Application Priority Data

Apr. 24, 2017 (WO) ................ PCT/CN2017/081693
May 22, 2017 (EP) ..................................... 17172309

(51) Int. Cl.
*H05B 45/357* (2020.01)
*H05B 45/40* (2020.01)
(Continued)

(52) U.S. Cl.
CPC .......... *H05B 45/357* (2020.01); *H05B 45/10* (2020.01); *H05B 45/37* (2020.01); *H05B 45/40* (2020.01)

(58) Field of Classification Search
None
See application file for complete search history.

(56) References Cited

U.S. PATENT DOCUMENTS 9,192,005 B2 * 11/2015 Beland ................ H05B 39/044
9,341,359 B1   5/2016 Fernandez et al.
(Continued)

FOREIGN PATENT DOCUMENTS

WO  2016145264 A1  9/2016

Primary Examiner — Crystal L Hammond
(74) Attorney, Agent, or Firm — Daniel J. Piotrowski

(57) ABSTRACT

A retrofit Light Emitting Diode, LED, tube for connecting to a High Frequency, HF, ballast, which LED tube comprises a switchable capacitor arrangement for ensuring that the ballast does not go into over current protection mode, wherein the switching is controlled based on a desired dimming level of the LED tube. The switchable capacitor arrangement is provided in parallel with said input of said rectifier, and comprises at least a first capacitor and a second capacitor in series, and said control circuit is adapted to configure said switchable capacitor arrangement to conduct the AC power and switch at least one of the first capacitor and the second capacitor between the rectifier and the LED array to block the DC power to said LED array.

12 Claims, 7 Drawing Sheets

(51) Int. Cl.
*H05B 45/37* (2020.01)
*H05B 45/10* (2020.01)

(56) References Cited

U.S. PATENT DOCUMENTS

| | | | |
|---|---|---|---|
| 2007/0152598 A1* | 7/2007 | Pak | H05B 41/36 |
| | | | 315/51 |
| 2012/0025802 A1* | 2/2012 | Carmen | H02M 5/293 |
| | | | 323/320 |
| 2014/0049174 A1 | 2/2014 | Radermacher et al. | |
| 2014/0204571 A1 | 7/2014 | Zhang et al. | |
| 2014/0265897 A1* | 9/2014 | Taipale | H05B 47/11 |
| | | | 315/200 R |
| 2016/0081147 A1* | 3/2016 | Guang | H05B 45/00 |
| | | | 315/123 |
| 2018/0112837 A1* | 4/2018 | Sadwick | F21S 9/03 |

* cited by examiner

RETROFIT LIGHT EMITTING DIODE, LED, TUBE FOR REDUCING AUDIBLE NOISE ORIGINATING FROM A HIGH FREQUENCY ELECTRONIC BALLAST

CROSS-REFERENCE TO PRIOR APPLICATIONS

This application is the U.S. National Phase application under 35 U.S.C. § 371 of International Application No. PCT/EP2018/059843, filed on Apr. 18, 2018, which claims the benefit of Chinese Patent Application No. PCT/CN2017/081693, filed on Apr. 24, 2017 and European Patent Application No. 17172309.1, filed on May 22, 2017. These applications are hereby incorporated by reference herein.

FIELD OF THE INVENTION

The present invention generally relates to the field of lighting and, more specifically, to a retrofit Light Emitting Diode, LED, tube. The present invention further relates to a lighting system comprising a high frequency electronic ballast and the retrofit LED tube, and to a method of operating a retrofit LED tube.

BACKGROUND OF THE INVENTION

Lighting devices have been developed that make use of Light Emitting Diodes, LED's, for a variety of lighting applications. Owing to their long lifetime and high energy efficiency, LED lamps are nowadays also designed for replacing traditional fluorescent lamps, i.e. for retrofit applications. For such an application, a retrofit LED tube is typically adapted to fit into the socket of the respective lamp fixture to be retrofitted. Moreover, since the maintenance of a lamp is typically conducted by a user, the retrofit LED tube should ideally be readily operational with any type of suitable fixture without the need for re-wiring the fixture.

Such a retrofit LED tube is, for example, disclosed in US 2015/0198290. Here, an LED lamp arrangement is disclosed for replacing a fluorescent lamp in a luminaire having a ballast for supplying power to the lamp. The LED lamp arrangement comprises a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration. Different configuration are used respectively for electromagnetic ballasts and electronic ballasts.

One of the drawbacks of the retrofit LED tube is that it does not function properly in case the LED tube also allows for dimming. More specifically, it is a drawback that audible noise is perceived at certain, low, dimming levels, in lighting systems that comprise a high frequency electronic ballast, wherein the audible noise is originating from a high frequency electronic ballast comprised by the lighting systems.

WO2016/145264A1 discloses a solid state fluorescent lamp and high intensity discharge replacement. It comprises capacitors that can be selectively coupled in parallel between the two AC inputs and in parallel with the rectifier and the LEDs.

SUMMARY OF THE INVENTION

The inventors have previously proposed (but not yet published at the filing date of this application) a first approach for solving the problems outlined above. This first approach will first be described, before a second approach, in accordance with this in invention, is explained.

The previously proposed approach is described with reference to FIGS. 1 to 3.

Reference numeral 1 in FIG. 1 designates a retrofit Light Emitting Diode, LED, tube for a fluorescent tube. An LED tube is retrofitted in case it fits in conventional armatures for fluorescent tubes, for example fluorescent tubes suitable for T5, T12 or anything alike. In order to fit in these conventional armatures, the retrofit LED tube 1 comprises conducting pens for connecting, and supporting, the retrofit LED tube 1 in the conventional armatures.

The retrofit LED tube 1 comprises an LED array 17 for emitting light. The LED array 17 may comprise a plurality of series and parallel connected LED's. Those skilled in the art will appreciate that in practical embodiments the LEDs are evenly distributed and spaced apart across the length of the tube 1, to provide for an evenly as possible lighting by the LED tube 1 over its entire length. The present disclosure is not limited to any specific type of LED, nor to any color LEDs. Typically, white colored LEDs are used.

The LEDs are powered through a rectifier having an input and an output, wherein the rectifier is arranged to receive an AC supply voltage at its input, from a connected HF ballast, in use, to convert the AC supply voltage to a DC voltage, and to provide the DC voltage to the LED array.

The rectifier is shown, in FIG. 1, using the two diodes indicated with reference numeral 15 and 20 in combination with the switches indicated with reference numeral 14 and 19. The rectifier is arranged to receive an AC supply voltage at its input, wherein the input is indicated with reference numerals 2 and 3. The main power supply which is arranged to provide that AC supply voltage is not a part of the retrofit LED tube 1 and is not shown in FIG. 1.

In the present example, the switches 14, 19 are directly controlled by a control unit 8. The working principle is as follows.

During a positive part of the AC supply voltage, the switch indicated with reference numeral 14 is closed allowing the current to flow through the switch 14, the LED array 17 and the dynamic capacitance 18 to the diode indicated with reference numeral 20. The diode 20 is in forward direction such that the current is able to flow through the diode 20 back to the input 3. In this case, the switch indicated with reference numeral 19 is opened.

During a negative part of the AC supply voltage, the switch indicated with reference numeral 19 is closed. The current then flows from the input 3 through the diode 15, which is in forward direction, the LED array 17, the switch 19 and the dynamic capacitance 18 back to the input indicated with reference numeral 2.

The rectifier shown in FIG. 1 thus operates according to the full wave rectification rectifying principle as it converts the whole of the AC supply voltage to one of constant polarity at its output.

Further, a synchronization circuit 13 is present for detecting the transitions of the AC supply voltage. That is, the synchronization circuit 13 is able to detect the current state of the AC supply voltage, i.e. whether the current state is positive or negative. This information is used, by the control unit 8, to correctly, and timely, control the switches indicated with reference numerals 14 and 19.

The control unit 8 is typically a microcontroller, a microprocessor, a Field Programmable Gate Array, FPGA, or anything alike. The synchronization circuit 13 is depicted as a stand-alone unit. However, the functionality of the synchronization circuit 13 may also be incorporated in the control unit 8 for efficiency purposes and for reducing the occupancy of physical space of the different electronic components.

In the present example, the retrofit LED tube 1 comprises a capacitor 16 at the output of the rectifier for smoothing out the DC supply voltage and for reducing any ripple current.

The retrofit LED tube 1 further comprises a dimming unit 12 for wirelessly receiving an input dimming level, and for dimming the emitted light by the LED array based on the received input dimming level. The dimming unit 12 may comprise an external, or internal, antenna 7 In order to be able to wirelessly receive the input dimming level. Typical transmission technologies that may be used for wirelessly transmitting the input dimming level comprise ZigBee™, Bluetooth™, WiFi based protocols, or any Mesh type of wireless network.

In the present example, the dimming unit 12 cooperates with the control unit 8 to realize the dimming effect. That is, the switches indicated with reference numeral 14 and 19 are controlled in such a way that they also provide for a dimming function.

That is, during a positive part of the AC supply voltage, the switch indicated with reference numeral 14 may not be closed during the whole positive part. Similarly, during a negative part of the AC supply voltage, the switch indicated with reference numeral 19 may not be closed during the whole negative part. Dimming is then realized by controlling the switches 14, 19.

A relay 5 may be provided in the AC supply voltage input 2 in order to turn-on and turn-off the LED array 17. The relay 5 may be controlled via the control unit 8.

In the present example, the control unit 8 is not powered by a separate battery, but is fed using the AC power. First, a galvanic isolation is provided using a transformer 4. A diode bridge 6 is connected to the second windings of the transformer for converting the AC supply voltage to a DC supply voltage. The DC supply voltage is stored in the capacitor 11. The capacitor 11 thus provides for DC power for empowering the control unit 8, the dimming unit 12 and, in some cases, the synchronization circuit 13. In this case, even if in standby state, the relay 5 cannot be completely off since the control unit 8 needs some power from the mains.

The present example is discussed with respect to an AC supply voltage of 230V, but may also operate in different kinds of AC supply voltages. Further, the present example is not limited to the specific rectifier or driver circuit as shown in FIG. 1. A skilled person is well aware of other types of rectifiers that are also suitable for empowering the LED's in the LED array. It is also noted that different kinds of dimming principles exist to actually dim the LED's in the LED array, all of which are suitable to be used.

A housing (not shown) may be provided for housing retrofit LED tube 1. More specifically, the housing may be arranged to house each of the components shown in FIG. 1. The housing may be a light transmissive housing or a partly light transmissive housing, configured as a retrofit tube type, for example.

The inventors have found that conventional high frequency ballast, more specifically the over-current functionality incorporated in the ballast, may cause audible noise. Audible noise is defined as noise perceivable to a human person. In order to combat that phenomena, the inventors have found to introduce an (additional) dynamic impedance/capacitor in series with the output of the ballast such that the perceived impedance by the ballast can be increased and such that the total current provided by the ballast can be controlled, i.e. reduced. It is thereby prevented that the ballast can get in an over-current situation.

In order to be able to control the output current of the ballast, this previously proposed (but not published) approach is to use a dynamic capacitance 18 to implement the switch 5 in series with the output of the ballast, i.e. at the input of the rectifier. The dynamic capacitance 18 is arranged to introduce a capacitance in series with the output of the ballast, when connected.

The amount of capacitance, i.e. the capacitance value, provided by the dynamic capacitance is controlled by the control unit 8. The control unit 8 uses the received input dimming level for determining the capacitance value, and controls the dynamic capacitance 18 accordingly. As such, there is a direct relationship between the received input dimming level and the capacitance value of the dynamic capacitance.

One specific implementations of the dynamic capacitance 18 is disclosed in FIG. 2, as block 51. Here, the left part 55 is connected to, or to be connected to, the output of the high frequency ballast present in conventional armatures for fluorescent tubes. The right part 57 is connected to the rectifier of the LED tube.

Normally, a static capacitor 54 is placed in line with the output of the ballast. The dynamic capacitance 51 is placed in series with the static capacitor 54.

The dynamic capacitance 51 comprises a capacitor 53, a resistor 52, and a switch 56 shunting both the capacitor 53 and the resistor 52. The capacitor 53 and the resistor 52 are effectively placed in series with the static capacitor 54 in case the switch 56 is controlled, by the control unit, to be open. As such, the total capacitance seen from the output of the ballast is decreased and the impedance is increased. The equivalent capacitance of two capacitors connected in series complies with the formula one over the equivalence capacitance equals one over the first capacitor plus one over the second capacitor.

The total capacitance, i.e. the above mentioned equivalent capacitance, should be decreased in order to make sure that the over current protection present in the ballast does not kick in. This can be achieved using the capacitors placed in series. A resistor 52 may be placed in series with the capacitor 53 for limiting inrush current, if any.

FIG. 3 shows a simplified electrical circuit diagram 71 illustrating an example of a high frequency ballast to be used in accordance with embodiments of the present disclosure.

The high frequency ballast comprises a controller 74, which controller 74 is arranged to control two switches 73, 75. The control of these switches 73, 75 typically occurs at a frequency above the audible spectrum, for example around 40 kHz-50 kHz.

In this particular situation, the switches 73, 75 are shown as Field Effect Transistors, FET. It is noted that any type of switch 73, 75 may be used in the ballast, such as regular transistors or the like.

The output of the switches 73, 75 is connected to the inductance 72 and the capacitor 76, wherein the intersection point 77 of the inductance 72 with the capacitor 76 form the output of the ballast. As such, this intersection point 77 is to be connected to the input of the retrofit LED tube.

The present disclosure has found a solution for, for example, the over current protection inside the controller 74. Conventional controllers 74 have the disadvantage that the control signal related to the over current protection, i.e. the signal for controlling the two switched 73, 75, has a frequency within the audible spectrum, for example in the range of 3 kHz-8 kHz. This frequency is emitted as sound waves and audible for a human being.

This above mentioned disadvantage is overcome by the approach explained above in that the retrofit LED tube comprises a dynamic capacitance, such that it can be prevented that an over current situation occurs at the ballast 71.

One issue with the approach explained above is that the dynamic capacitance is charged by the AC supply and easily reaches a very high voltage such as 1 kV. This makes control of the capacitor difficult, because switching a high voltage element may damage the switch used. This means the approach above is of primary interest for static control during a standby mode, but it may not be suitable for duty cycle-based dimming which takes place at a high frequency. There is also an issue that it may not be possible to turn the LED off completely to prevent any glow.

It would be advantageous to achieve a retrofit Light Emitting Diode, LED, tube that reduces audible noise originating from a high frequency electronic ballast, as well as a lighting system comprising such a retrofit LED tube and the high frequency electronic ballast. It would also be desirable to achieve a method of operating a LED tube such that the audible noise originating from the high frequency ballast is reduced.

To better address one or more of these concerns, in a first aspect of the invention, a retrofit Light Emitting Diode, LED, tube for connecting to a High Frequency, HF ballast is presented. The retrofit LED tube comprises:

a LED array for emitting light;

a rectifier having an input and an output, wherein the rectifier is arranged to receive AC power at its input from a connected HF ballast and, in use, to convert said AC power to DC power, and to provide said DC power to said LED array;

a dimming unit arranged for receiving an input dimming level;

a switchable capacitor arrangement arranged for introducing a capacitance to said connected HF ballast; and a control unit arranged for controlling the switching of the switchable capacitor arrangement based on said received input dimming level, wherein the switchable capacitor arrangement is provided in parallel with said input of said rectifier, and comprises a switch, at least a first capacitor and a second capacitor, and said control circuit is adapted to control the switch to allow said switchable capacitor arrangement to conduct the AC power by switching alternative one of the first capacitor and the second capacitor between the rectifier and the LED array to block the DC power to said LED array in opposing phases of the AC power.

It was the insight of the inventors that a switchable capacitor arrangement should be controlled based on the received input dimming level. This has the advantage that the high frequency ballast output current can be controlled and that, thus, the audible noise originating from the high frequency electronic ballast can be controlled.

Here below, an explanation is provided with respect to the cause of the audible noise.

Typically, the high frequency ballast operates at a frequency far above the audible frequency spectrum, such as, for example, above 20 kHz. This has a number of advantages. First, it reduces any undesired flicker effect, and, second, it assures that people are not bothered in case sound waves are emitted in that particular frequency range.

Audio noise may appear in high frequency ballasts due to high current levels occurring in the ballast. Audio noise frequencies are often the result of ballast frequency intermodulation, for example mains input frequency or a ballast over-current protection circuit.

A high frequency electronic ballast is typically depicted as a control circuit controlling a half H-bridge, wherein the output of the half H-bridge is connected to an inductance in series with a capacitor, wherein the intersection point between the inductance and the capacitor forms the output of the ballast. As mentioned above, the half H-bridge, i.e. the two switches of the half H-bridge, operates at a frequency above 20 kHz, for example around 50 kHz-60 kHz. The frequency is increased in case an over-current situation is detected. The increasing of the frequency is accomplished by providing control signals, by the control circuit, to the half H-bridge. The control signal has its own frequency which is typically in the audible frequency range, for example somewhere between 5 kHz-10 kHz. As such, the cause of the audible noise originating from the high frequency electronic ballast is often the over-current protection circuit, i.e. the frequency of the control signal that ensures that the operating frequency of the half H-bridge is increased.

High ballast output current will normally occur when the total emitted light, by the LED array, is low, i.e. when the received input dimming level is low. This is caused by the rectifier present in the retrofit LED tube. In the context of the present disclosure, a low dimming level means that the emitted light is reduced compared to a high dimming level.

Typically, a static capacitor is already present at the input of the rectifier. The efficiency of the LED tube will decrease in case a static capacitor is chosen having a capacitance value dimensioned in such a way that the high frequency ballast will not get into an over-current protection mode. That is, a static capacitor having a sufficiently large impedance for ensuring that the high frequency ballast does not go into over-current protection mode has the disadvantage effect that, in situations when the received input dimming level is high, for example when no dimming is to be applied, not enough current can be supplied for fully using the LED array to its potential. That is, the LEDs of the LED array may not be used in their full range.

In accordance with the present disclosure, the dimming unit is provided in the retrofit LED tube. A user may operate the dimmer switch by setting a desired input dimming level. The inputted dimming level is then transmitted e.g. wirelessly to the dimming unit, and the dimming unit will dim the emitted light by the LED array based on the received input dimming level. The dimmer switch in combination with the dimming unit thus enables a user to adjust the intensity of the LED array to a desired level.

The retrofit LED tube comprises a rectifier in order for the LED tube to be used as a replacement tube for a fluorescent tube. The rectifier is arranged to receive an AC supply voltage at its input, to convert the AC supply voltage to a DC voltage, and to provide said DC voltage to the LED array. Different type of rectifiers exist, each of which suitable to be used in the retrofit LED tube according to the present disclosure. For example, a half-wave rectification rectifier only allows the positive part of the AC supply voltage to pass, while blocking the negative part of the AC supply voltage. This is typically accomplished using a single diode. In another example, a full wave rectification rectifier converts the whole of the AC supply voltage to one of constant polarity at its output. The positive part of the AC supply voltage is allowed to pass, and the negative part of the AC supply voltage is converted to a positive part. This may be accomplished using a bridge rectifier, or by using two diodes in combination with switches.

As mentioned above, a control unit is provided which is arranged for controlling switching of the switchable capacitor arrangement based on said received input dimming level. As such, there is a direct coupling, i.e. a direct relationship, between the dimming level and the control of the switchable capacitor arrangement. Thus, the control unit uses the dimming level as an input for determining the control of the switchable capacitor arrangement.

The control unit may be any type of hardware such as a microprocessor, a micro controller, a Field Programmable Gate Array, FPGA, or anything alike. The control unit may be empowered via the AC supply voltage, via the same or another rectifier, or may be empowered using an auxiliary power supply such as a battery.

It is noted that the functionality of the dimming unit may be incorporated in the control unit itself. The dimming unit is not, per se, a separate physical piece of hardware.

An advantage of the first aspect over the prior embodiments of FIGS. 1 and 2 is that the dimming can be implemented in a reliable way. The two series capacitors shares the voltage stress, and switching each of them is not a switching as high as 1000 V in the prior embodiments, thus a high frequency switching is allowed to implement both PWM (pulse width modulation) dimming, besides low frequency switching of standby is also allowed. Further, the claimed aspect switches at least one of the two capacitors between the output of the rectifier and the LED such that the capacitor is capable of blocking the DC power to the LED. Thus there is no glowing in the LED.

The first capacitor and the second capacitor preferably have a junction between them, and wherein the control unit is adapted to control a connection between the junction and the output of the rectifier. If the switch is closed the normal connections are established. If the switch is open, the conduction path includes an alternative one of the capacitors (depending on the polarity of the input signal). This embodiment provides a specific circuit implementation which is quite simple. If the switch is closed, the capacitors are like the parasitic capacitance of the rectifier diode and can be omitted, and in turn the LED array can be driven normally.

The junction is further connected to the anode or the cathode of the LED array. Thus, control unit also controls the connection of an output of the rectifier and the LED array. The switch is between the junction with the anode or the cathode of the LED array and the output of the rectifier. This embodiment provides a specific implementation in using the capacitors in series between the LED electrode and the rectifier output so as to block the DC power.

Thus, the switch is between the rectifier output and the LED array, and said first and said second capacitors are coupled between a respective rectifier input and the LED array side of the switch. The switch may be on the high or low output line of the rectifier, so the output of the rectifier may be the high or low output.

The switch for example comprise any of a bipolar transistor and a power Metal Oxide Semiconductor, MOS, Field Effect Transistor, FET. High frequency switching component can be used since the switching is no longer high voltage switching.

The control unit may be adapted to be controllable between:

a first mode in which the junction and the LED array are isolated from the output of the rectifier such that the alternative one of the two capacitors is between the LED array and the output of said rectifier to block the DC power; and a second mode in which the junction and the LED array are connected to the output of the rectifier thereby to allow the LED array to be powered by the DC power.

In the first mode the capacitor decouples the junction and the LED array from the rectifier. There is only a capacitance conduction path between the rectifier and the load. In the first mode, an alternative one of the capacitors is in series with along that conduction path. Which of the two capacitors is in the series path depends on the polarity of the AC input power. The series capacitor thus functions as a DC block so that no DC current passes through the LED load. Thus, it can be avoided that any current flows, thus preventing glow.

In the second mode, each capacitor is for example in parallel with a diode of the rectifier (in the case of a diode bridge rectifier), and simply behaves as an additional parasitic capacitance. Thus, the normal rectification function can be resumed.

The control unit may comprise a detection circuit for detecting the LED current or the output current of the rectifier, and is arranged to switch between the first and second modes according to said received input dimming level and the detected current. Thus, the mode switching is used to implement the dimming functionality in a simple manner. The first way of the detection circuit is more accurate since the LED current is regulated, and it may require an isolation circuit. The second way of the detection may not require the isolation.

Output current limitation may also be ensured, in order to prevent over-current protection by the ballast. In particular, the peak current can be controlled as well as the average current, in order to achieve a desired dimming level, without triggering over-current protection.

Said switching between the first and second modes is able to take place at a frequency of greater than 20 kHz, however any suitable frequency may be used such as from 100 Hz to 10 MHz depending on cost, size etc. Typically, the frequency is in the range 500 Hz to 1 MHz. Thus, high frequency dimming control is possible. The use of two capacitors means that the voltage across the switch is reduced.

The rectifier for example comprises full bridge diode rectifier, with a first input and a second input, and a positive output and a negative output, wherein said positive output and said negative output are respectively adapted to connect to an anode and an cathode of the LED array, and wherein the switchable capacitor arrangement is provided in parallel with the first input and the second input, and the switch is connected between said positive output or said negative output and a corresponding electrode of the LED array. The capacitors of the switchable capacitor arrangement then are each placed in parallel with a respective one of the diodes when the switch is closed.

The retrofit LED tube may further comprising a dummy load and a smoothing capacitor each in parallel with the LED array. This dummy load may further limit the LED array voltage below its forward voltage to prevent glow.

The LED array, the rectifier, the dimming unit, the switchable capacitor arrangement and the control unit may be integrally accommodated in a single housing, such as a light transmissive housing or a partly light transmissive housing, configured as a retrofit tube type, for example.

The invention also provides a lighting system, comprising:

a high frequency electronic ballast, and
a retrofit LED tube as defined above,
wherein the retrofit LED tube is to be connected to said high frequency electronic ballast.

The lighting system may further comprise:

a dimmer switch arranged for setting, by a user, an input dimming level, and arranged for transmitting said input dimming level to said dimming unit comprised by said retrofit LED tube.

The dimmer switch may be a battery powered switch which can be mounted on a wall or the like. In such a case, the dimmer switch merely transmits the inputted dimming level to the dimming unit of the retrofit LED tube. The dimmer switch may be mounted using screws or adhesive tape or the like.

Alternatively, the dimmer switch may be installed in such a way that it switches a power line from the main power supply to the retrofit LED tube. That is, the dimmer switch is arranged to "turn-on" the LED tube by ensuring that the power line is connected from the main power supply to the LED tube, and the dimmer switch is arranged to "turn-off" the LED tube by ensuring that the power line between the main power supply and the LED tube is interrupted. Further, the dimmer switch is designed in such a way that a user can input its desired dimming level, and that the inputted dimming level is wirelessly transmitted to the dimming unit comprised by the LED tube.

In yet another alternative, the functionality of the dimmer switch may be implemented as an application "app" on a mobile device, such as a mobile phone or a tablet. That is, the mobile device is arranged to receive, via a touch screen, a desired dimming level of the LED tube, and is arranged to transmit the desired dimming level to the dimming unit of the LED tube.

Examples in accordance with another aspect of the invention provide a method of operating a retrofit LED tube, which is connected to a high frequency, HF, ballast, said retrofit LED tube comprising an LED array for emitting light, a rectifier having an input and an output, and a switchable capacitor arrangement, provided in parallel with said input of said rectifier, and arranged for introducing a capacitance to said connected HF ballast, wherein the method comprises:

receiving AC power from a connected HF ballast and using the rectifier to convert said AC power to DC power;

receiving an input dimming level; and controlling switching of said switchable capacitor arrangement based on said received input dimming level, wherein the switchable capacitor arrangement comprises a switch, at least a first capacitor and a second capacitor in series, and said step of controlling comprises:

control said switch to allow said switchable capacitor arrangement to conduct the AC power by switching an alternative one of the first capacitor and the second capacitor in series between an output the rectifier and the LED array to block the DC power to said LED array in opposing phases of the AC power.

The first capacitor and the second capacitor preferably have a junction between them, and wherein controlling the switching comprises switching between:

a first mode in which the junction and the LED array are isolated from the output of the rectifier such that the alternative one of the two capacitors is in series between the LED array and the output of said rectifier to block the DC power; and a second mode in which the junction and the LED array are connected to the output of the rectifier thereby to allow the LED array to be powered by the DC power.

The method may comprise detecting the LED current or the output current of the rectifier, and switching between the first and second modes according to said received input dimming level and the detected current. The switching between the first and second modes may take place at a high frequency of greater than 100 Hz, such as above 500 Hz, such as above 20 kHz.

The retrofit LED tube and operating method according to the present disclosure is advantage for use of an LED array with a high frequency electronic ballast which is often used in conventional fluorescent tubes. Conventional fluorescent tubes typically have a negative internal resistance characteristic once the gas in the tube is ionized. The means that as the current increases through the tube, the resistance of the tube decreases. The decrease in resistance causes the current to further increase such that the tube could potentially be destroyed by an excess current. For this reason, a current limiting high frequency electronic ballast is provided in these conventional fluorescent tubes. The ballast ensures that sufficient current may flow through the tube for proper functioning of the fluorescent tube, but will prevent the current from increasing to a level at which the tube will destroy itself. As such, the high frequency electronic ballast functions as some sort of current limiting device. The current limiting aspect of the high frequency ballast operates at a frequency which is in the audible frequency range, for example between 5 kHz-10 kHz. This has the disadvantageous effect that the ballast may generate audible noise. This issue is addressed by the invention.

These and other aspects of the invention will be apparent from and elucidated with reference to the embodiment(s) described hereinafter.

DETAILED DESCRIPTION

The invention provides a retrofit Light Emitting Diode, LED, tube for connecting to a High Frequency, HF, ballast, which LED tube comprises a switchable capacitor arrangement for ensuring that the ballast does not go into over current protection mode, wherein the switching is controlled based on a desired dimming level of the LED tube.

This invention makes use of a switchable capacitor arrangement, but it comprises a capacitor arrangement, in particular at least two capacitors, placed in parallel across the AC input. This avoids current flow through the LED array meanwhile prevents the ballast from self-protection (audible noise), and also enables reduced voltages across the individual capacitors, thereby making the switching easier to implement at high frequencies. The advantages of this alternative arrangement will become more clear from the explanation below.

The invention is described with reference to FIGS. 4 to 9. The same components are given the same reference numbers in FIGS. 4 to 8 and a description of those repeated components is not duplicated.

Figure 1:
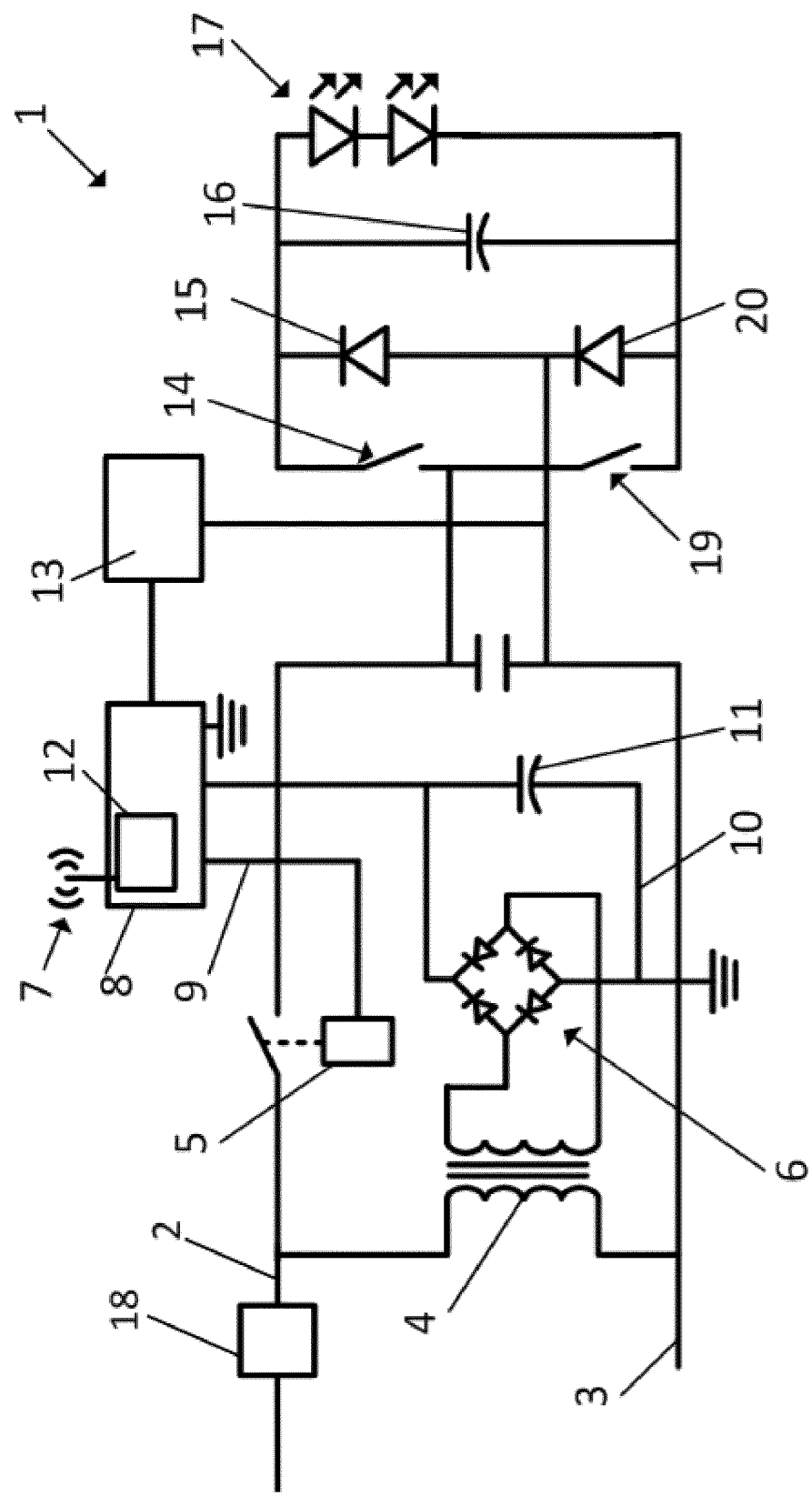
FIG. 1 shows an electrical circuit diagram of an example of a retrofit Light Emitting Diode, LED, tube as previously proposed by the applicant.
Figure 2:
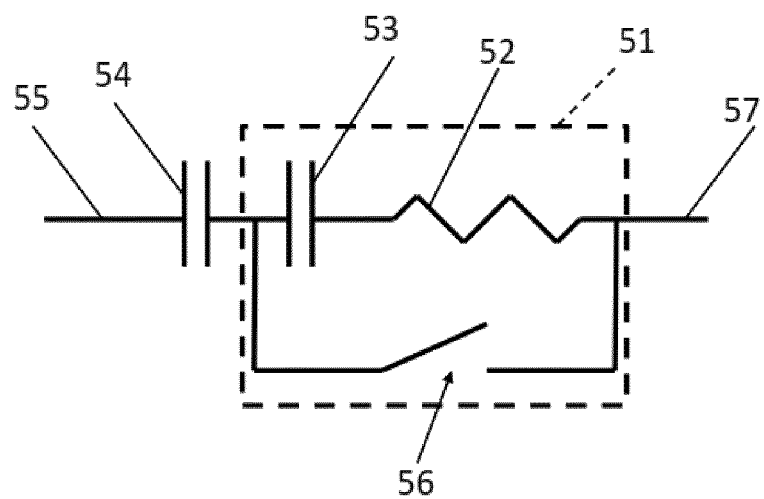
FIG. 2 shows an implementation of the dynamic capacitance.
Figure 3:
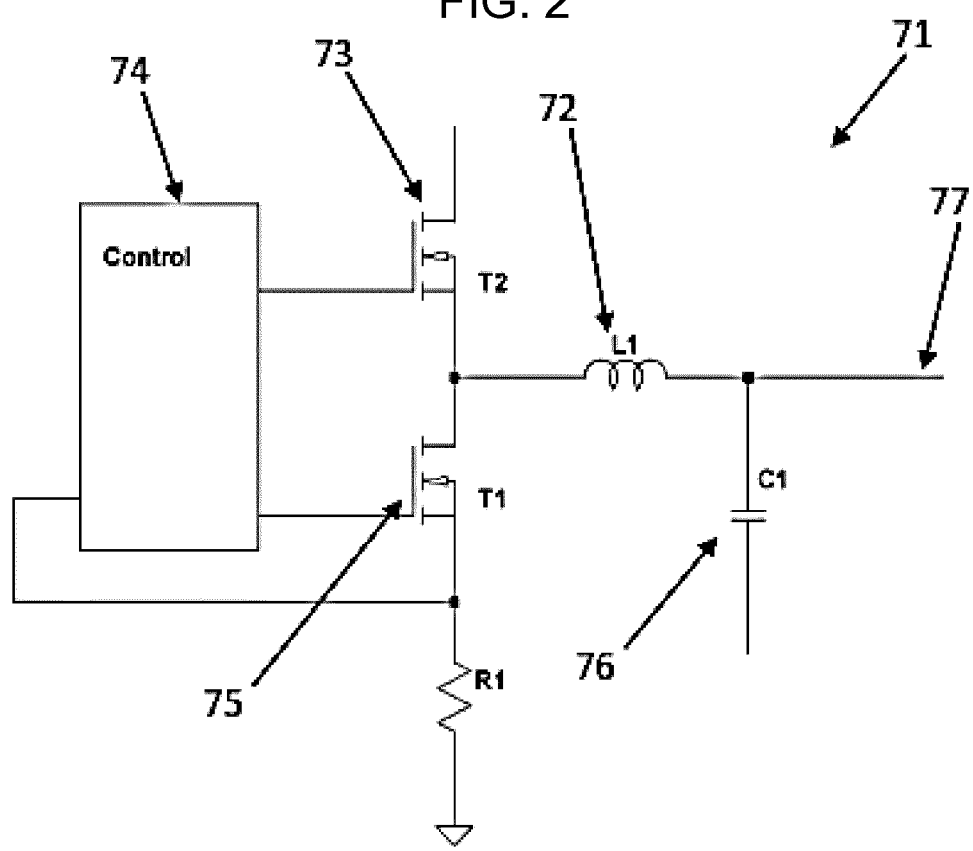
FIG. 3 shows a simplified electrical circuit diagram illustrating an example of a high frequency ballast to be used in accordance with embodiments of the present disclosure.
Figure 4:
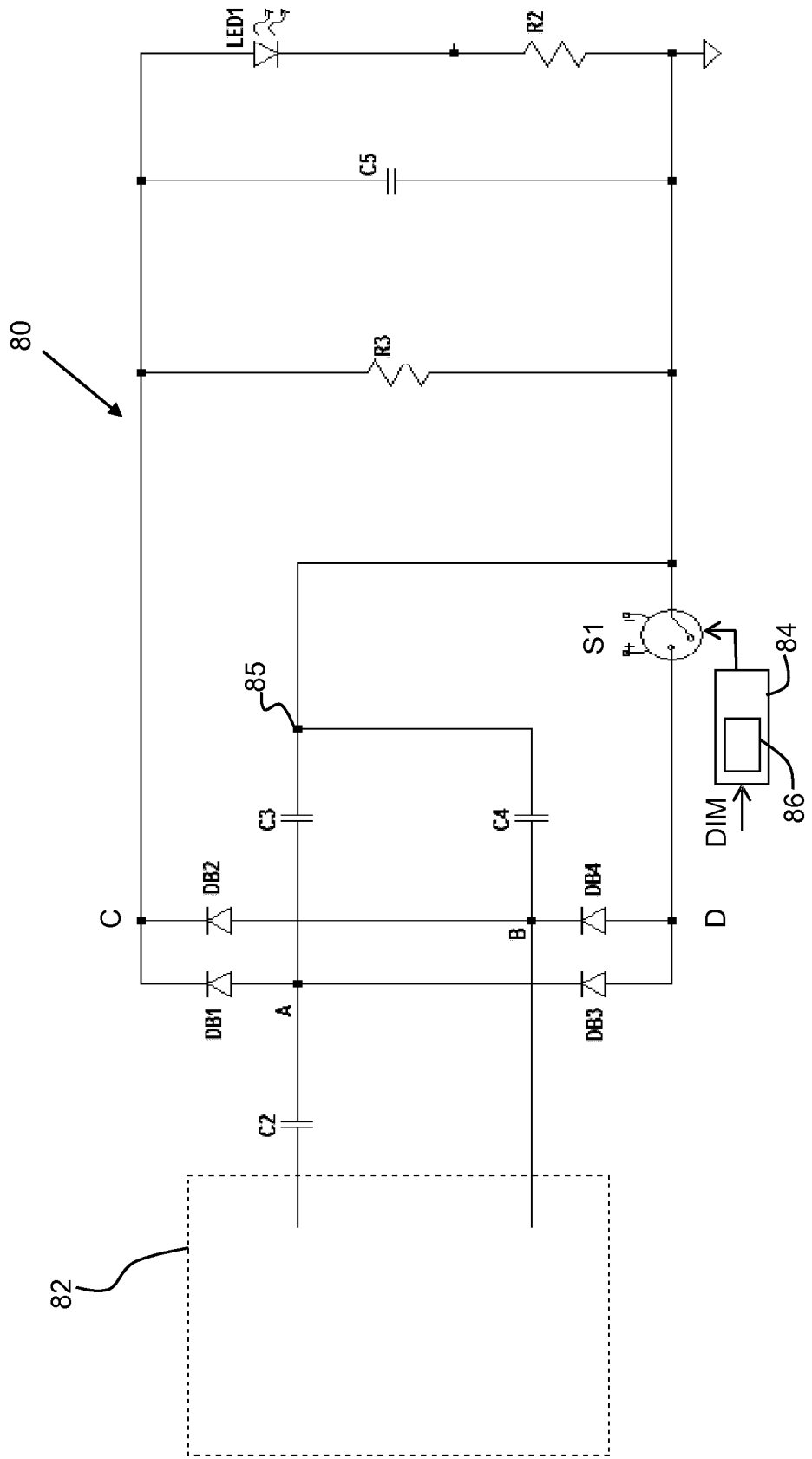
FIG. 4 shows a first example of a circuit for a retrofit LED tube.

FIG. 4 shows a first example of the circuitry 80 of a retrofit Light Emitting Diode, LED, tube for connecting to a High Frequency, HF, ballast 82. The retrofit LED tube comprises an LED array LED1 for emitting light. A rectifier has an input formed by two terminals A,B and an output formed by two terminals C,D. The rectifier receives an AC power supply at its input, i.e. across the two terminals A,B, from the connected HF ballast 82 converts the AC power to DC output power, provided across the output terminals C,D, which is provided to the LED array LED1.

A full wave rectifier is shown with four diodes DB1 to DB4 in a full bridge configuration, but a half-wave rectifier only may be used for example using a single diode. The preferred full wave rectifier converts the whole of the AC supply voltage to one of constant polarity at its output. The positive part of the AC supply voltage is allowed to pass, and the negative part of the AC supply voltage is converted to a positive part. This may be accomplished using the diode bridge rectifier as shown, or by using two diodes in combination with switches.

A dimming unit 84 is arranged for receiving an input dimming level "DIM".

A switchable capacitor arrangement comprises two series capacitors C3, C4 between the rectifier inputs A,B, arranged for introducing a capacitance to said connected HF ballast. The switchable capacitor arrangement also comprises a switch S1 such as a transistor between an output D of the rectifier and the junction 85 between the capacitors C3, C4. As explained below, the switch S1 may be connected to either of the two output terminals C,D.

A control unit 86 (which may be part of the dimming unit) controls the switching of the switchable capacitor arrangement based on the received input dimming level. As such, there is a direct coupling, i.e. a direct relationship, between the dimming level and the control of the switchable capacitor arrangement. Thus, the control unit uses the dimming level as an input for determining the control of the switchable capacitor arrangement. What is to be noted that the term dimming level includes 100 percent output to zero percent output, wherein zero percent output includes the state of standby (no output).

This has the advantage that the high frequency ballast output current can be controlled and that, thus, the audible noise originating from the high frequency electronic ballast can be controlled due to the introduced capacitance.

The dimming unit 84 is for example provided in the retrofit LED tube. A user may operate a remote dimmer switch by setting a desired input dimming level. The inputted dimming level is then transmitted e.g. wirelessly from the dimming switch to the dimming unit 84, and the dimming unit will dim the emitted light by the LED array based on the received input dimming level. The dimmer switch in combination with the dimming unit thus enables a user to adjust the intensity of the LED array to a desired level.

The switch S1 functions as an impedance transition switch. It allows an adjustable constant current to flow through the LED string, and allows the current to be switched between a capacitor load and the LED string load to maintain the ballast function and implement wireless dimming and standby control. When the switch S1 is ON, the current from the ballast is rectified and delivered to the LED load. When the switch S1 is OFF, current from the ballast passing through the two capacitors and hence no DC current is delivered to the LED load (the capacitor blocks the DC current between the rectifier and the LED array). Thus, by controlling the duty cycle of the above two operation modes, dimming control of the LED current can be realized.

FIG. 4 additionally shows a dummy load R3, output capacitor C5 and a current sense resistor R2 adapted to sense the LED array current for the control unit 84 to do close loop control. Capacitor C2 is a matching capacitance between LED tube and the ballast, for reducing the ballast output current to match LED power. It provides a safety function, meeting leakage current requirements.

Operation of the switch S1 enables two modes of operation.

In a first mode, the junction 85 between the capacitors C3 and C4 and the LED array are isolated from the output D of the rectifier such that the two capacitors are in series with said connected HF ballast and an alternative one of the two capacitors C3, C4 is between the LED array and the input A, B of said rectifier to block the DC power.

As can be seen in FIG. 4, the junction 85 connects to both inputs A, B through a respective one of the capacitors. The ballast output is connected by the two capacitors. However, in operation only one pair of diodes of the rectifier is active at any time and in turn only one of the capacitors is in series along the actual current conduction path between the rectifier and the LED array.

Figure 5:
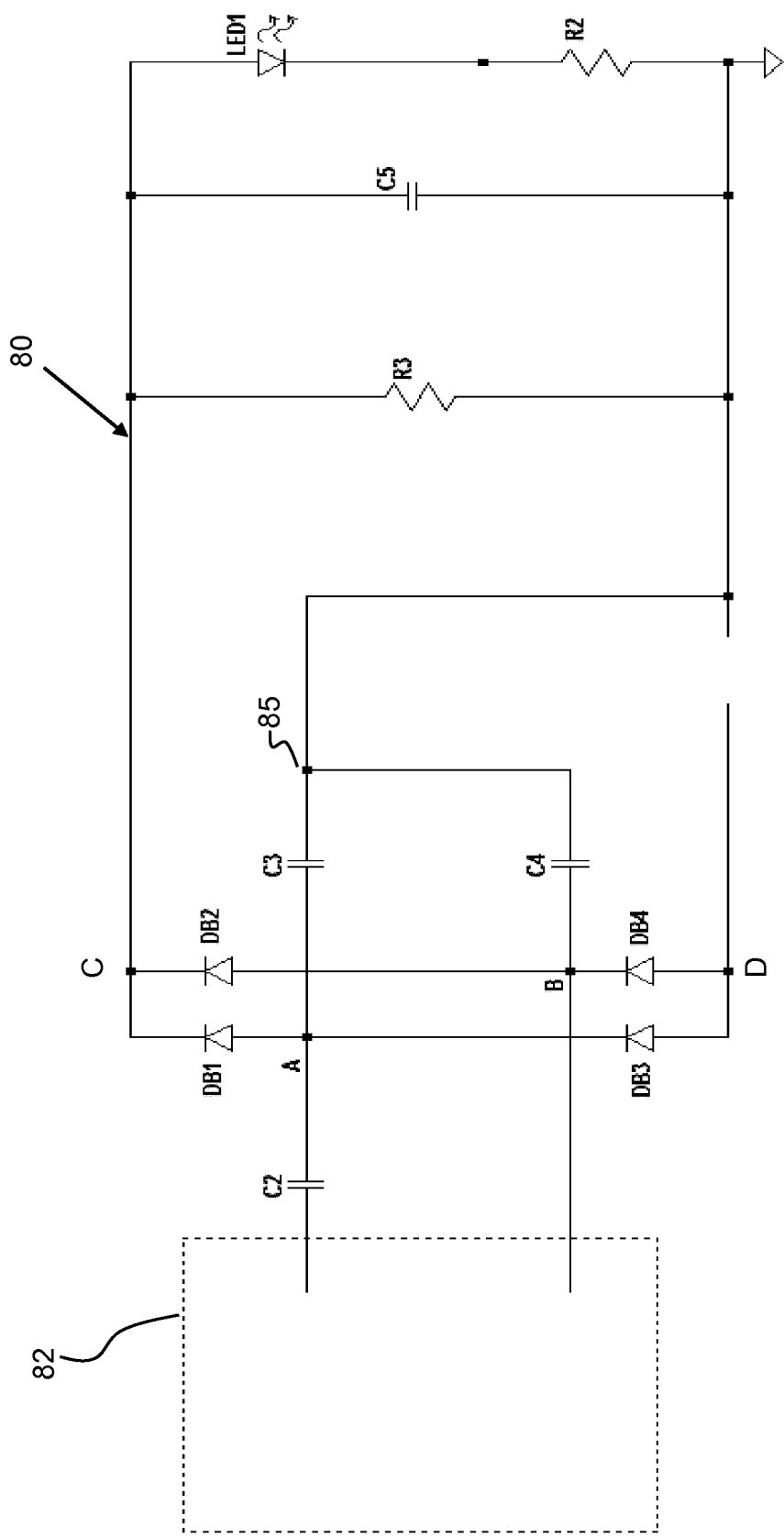
FIG. 5 shows the circuit of FIG. 4 in a first mode.

FIG. 5 shows an equivalent circuit in the first mode of operation. The switch has been replaced by an open circuit.

It can be seen that at any given time during the first mode of operation one of the capacitors is switched such that it is in the active current path between the rectifier and the LED array to block the DC power to said LED array.

In the first mode, there is a high voltage drop on C3 and C4, for example 1 kV. With the same capacitances for C3 and C4, each capacitor needs to withstand 500V, thus reduced by the use of two capacitors.

In a second mode, the junction 85 and the LED array are connected to the output D of the rectifier thereby to allow the LED array to be powered by the DC power.

Figure 6:
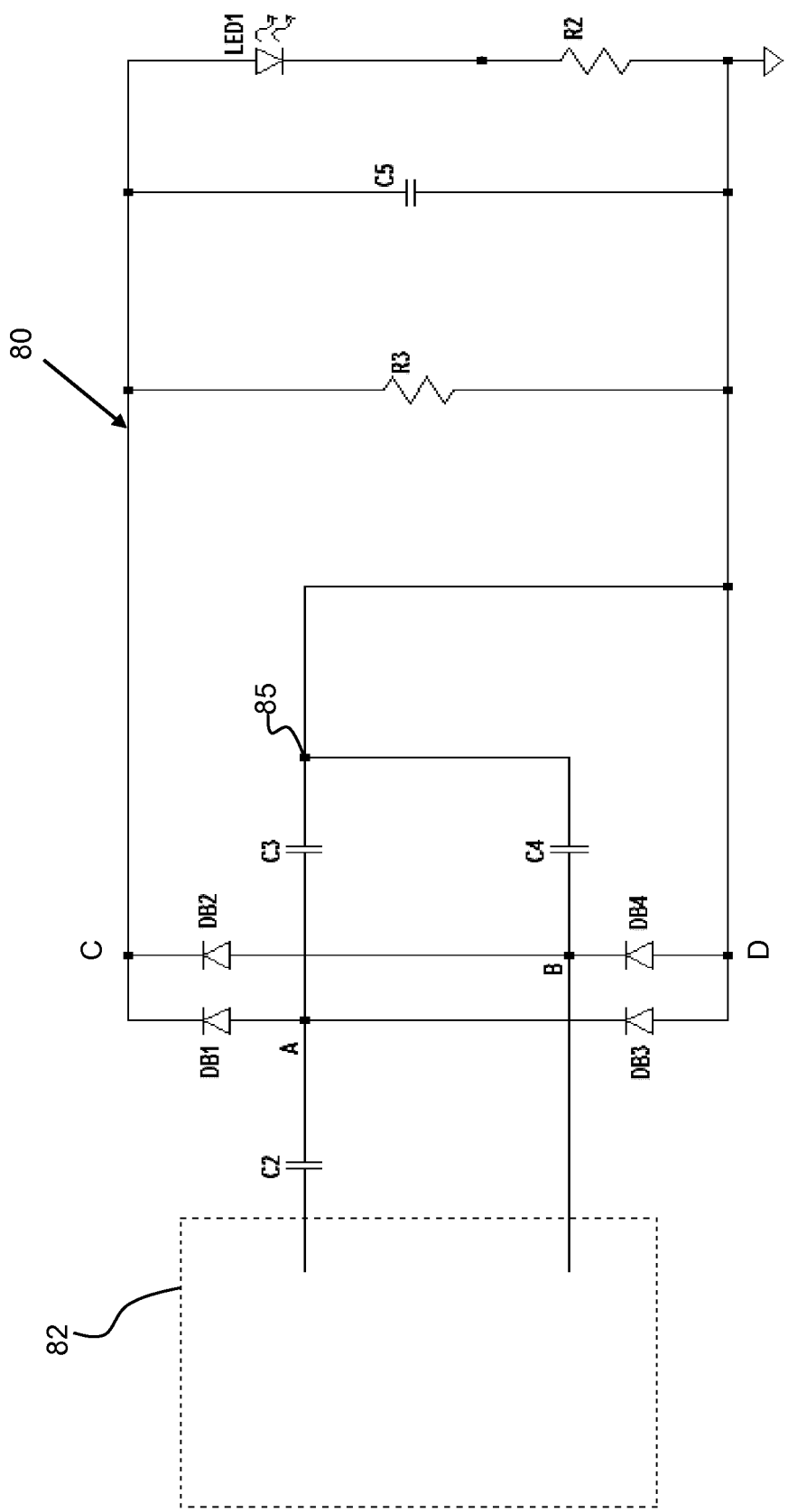
FIG. 6 shows the circuit of FIG. 4 in a second mode.

FIG. 6 shows an equivalent circuit in the second mode of operation. The switch has been replaced by a closed circuit.

In the second mode, each capacitor is for example in parallel with a diode of the rectifier (in the case of a diode bridge rectifier), and simply behaves as an additional parasitic capacitance. Thus, the normal rectification function can be resumed. C3 is in parallel with DB3 and C4 is in parallel with DB4.

When S1 is ON permanently, the duty cycle of S1 is 100% so the ballast output current flows through the LED string, and a maximum current output is achieved (e.g. 120 mA). When S1 is OFF permanently, the duty cycle of S1 is 0% and no current passes through the LED string. By adjusting the duty cycle of S1 between 100% and 0%, different level constant current is obtained through the LED string.

There are various ways to control the timing of operation of the switch S1. A first approach is to detect the average current through LED string using the current sense resistor R2. When the output current is too high with respect to the dimming level, the duty cycle of S1 is decreased; and when it is too low, with respect to the dimming level the duty cycle of S1 is increased. This approach may require an isolated gate driver for the switch S1, so the cost is relatively high. The reason is that the switch S1 and the sense resistor R2 are not closely grounded.

Figure 7:
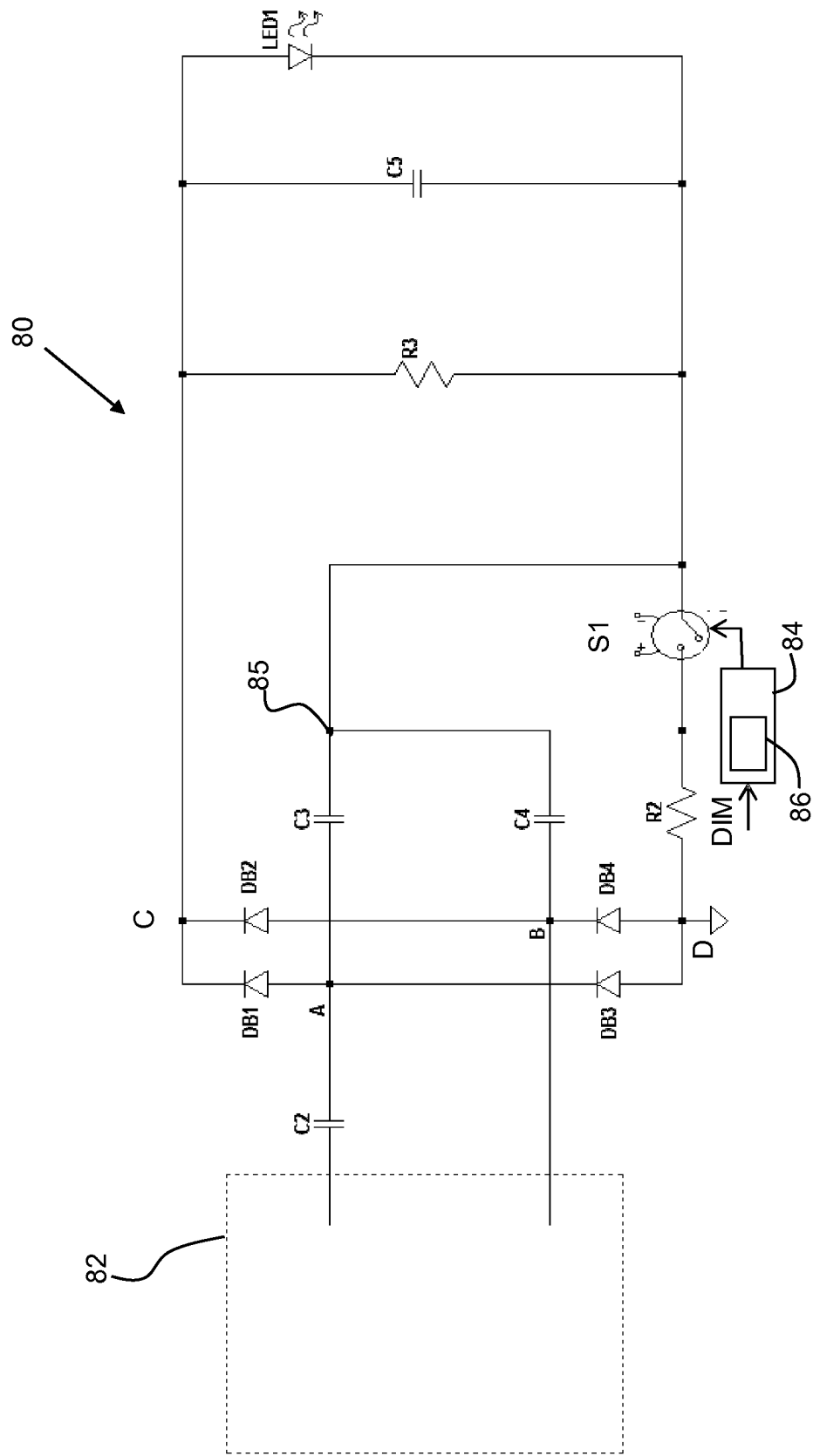
FIG. 7 shows a second example of a circuit for a retrofit LED tube.

An alternative is to detect the peak current through the LED load. FIG. 7 shows an example circuit for this purpose.

The current sense resistor R2 is moved to the input side of the switch S1. This means a normal gate driver may be used, and the peak current can instead be controlled to derive the average current of the LED string. When sense the current at the lower or upper side of the rectifier, the sensed current signal is at a close potential of the source node of the MOSFET. The GND is connected to the lower side of the rectifier. The source node of the MOSFET is close to the GND potential. Therefore the gate drive circuit can be easily arranged and we don't need a level shifter/isolator, which would be necessary if we sense directly the LED current (which is at the Drain node of the MOSFET). This approach has a lower cost. A certain mapping is then provided between the rectifier output current and the real LED output so the control unit 84 can control the LED output by regulating the rectifier output current.

Figure 8:
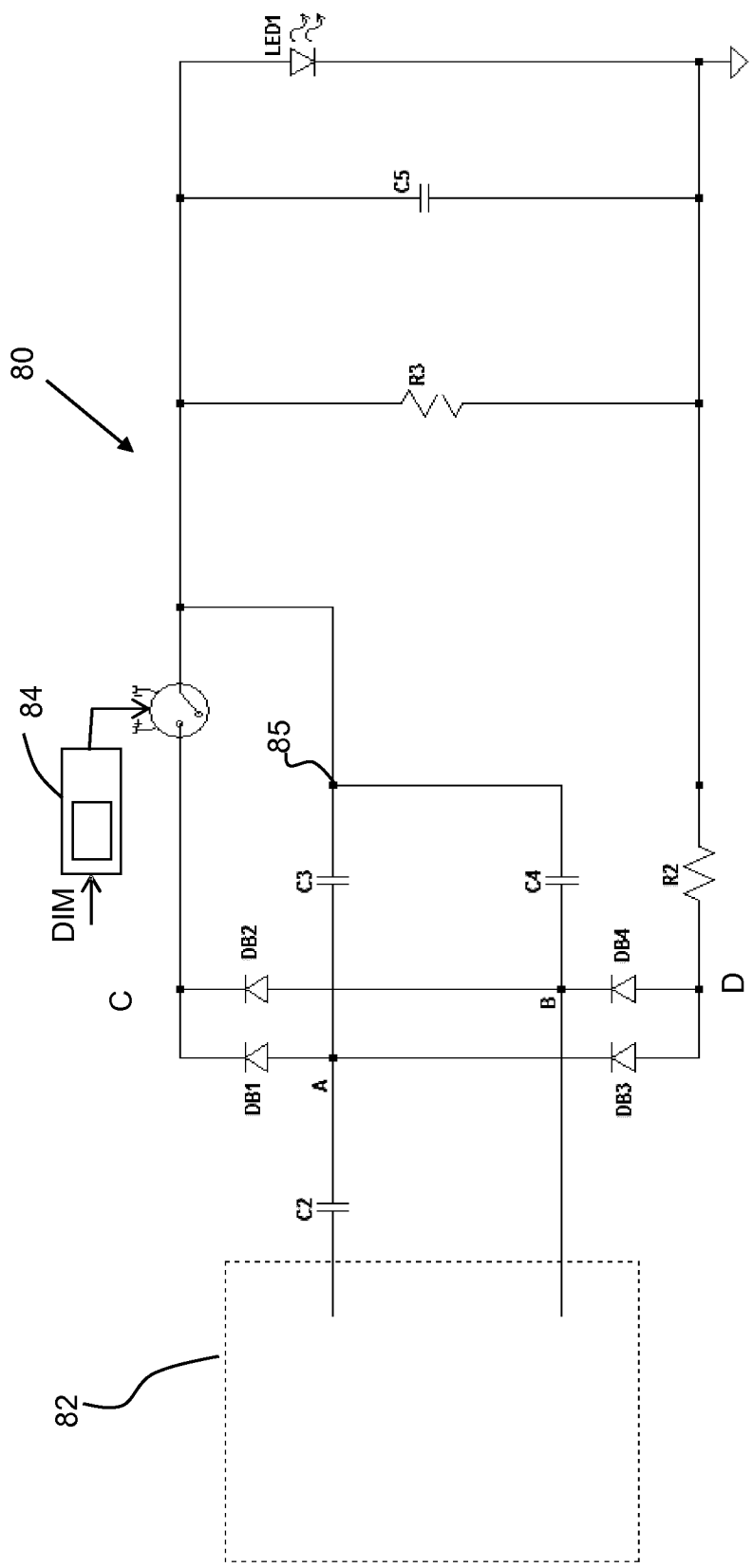
FIG. 8 shows a third example of a circuit for a retrofit LED tube.

The examples above show the switch S1 on the low side. However it may equally be on the high side as shown in FIG. 8, between the junction 85 and the high side output C.

There may be control of one or both of the peak current and the average current. For example output current limitation may also then be ensured, in order to prevent overcurrent protection by the ballast.

The switching between the first and second modes is able to take place at a high frequency, for example above 100 Hz, and possibly into the kHz range, such as between 500 Hz and 1 MHz. Thus, high frequency dimming control is possible.

The LED array, the rectifier, the dimming unit, the switchable capacitor arrangement and the control unit may be integrally accommodated in a single housing, such as a light transmissive housing or a partly light transmissive housing, configured as a retrofit tube type, for example.

Figure 9:
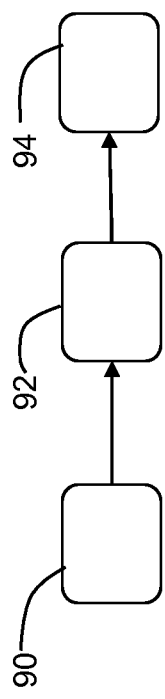
FIG. 9 shows a driving method.

FIG. 9 shows a method of operating a retrofit LED tube, which is connected to a high frequency using the circuit described above.

The method comprises:
in step 90, receiving AC power from a connected HF ballast and using the rectifier to convert said AC power to DC power;
in step 92, receiving an input dimming level; and
in step 94, controlling switching of said switchable capacitor arrangement based on said received input dimming level to achieve the current control explained above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A retrofit Light Emitting Diode, LED, tube for connecting to a High Frequency, HF, ballast, said retrofit LED tube, comprising:
an LED array (LED1) for emitting light;
a rectifier (DB1, DB2, DB3, DB4) having two AC terminals (A, B) and two DC terminals (C, D), wherein the rectifier is arranged to receive AC power at its AC terminals from a connected HF ballast and, in use, to convert said AC power to DC power, and to provide said DC power to said LED array via the two DC terminals (C, D);
a dimming unit arranged for receiving an input dimming level;
a switchable capacitor arrangement (C3, C4, S1) arranged for introducing a capacitance to said connected HF ballast; and
a control unit arranged for controlling the switching of the switchable capacitor arrangement based on said received input dimming level,
wherein the switchable capacitor arrangement comprises a switch (S1), at least a first capacitor (C3) and a second capacitor (C4), and said control circuit is adapted to control the switch (S1) to switch alternate one of the first capacitor and the second capacitor in series between alternate one of AC terminals (A, B) of the rectifier and the LED array and cut off a connection of the LED array to one of the two DC terminals (C, D) thereby blocking the DC power to said LED array in opposing half cycles of the AC power;
wherein the first capacitor and the second capacitor have a junction between them, and wherein the control unit is adapted to control a connection between the junction and one of the DC terminals of the rectifier, and wherein
the control circuit is adapted to control the switch (S1) to switch the other one of the first capacitor and second capacitor in parallel with the other one of the AC terminals (A, B) and the series connection of the one of the first capacitor and the second capacitor and the LED array;
wherein the junction is further connected to the anode or the cathode of the LED array, and the switch (S1) is between the junction with the anode or the cathode of the LED array and the one DC terminal of the rectifier.

2. A retrofit LED tube as claimed in claim 1, wherein said switch (S1) comprises any of a bipolar transistor and a power Metal Oxide Semiconductor, MOS, Field Effect Transistor, FET, and
said control circuit is adapted to allow the one of the first capacitor and the second capacitor to discharge in one subsequent phase after the one of the first capacitor and the second capacitor is switched in series between an output of the rectifier and the LED array to block the DC power to said LED array in one phase.

3. A retrofit LED tube as claimed in claim 1, wherein the control unit is adapted to be controllable between:
a first mode in which the junction and the LED array (LED1) are isolated from the output of the rectifier such that the alternative one of the two capacitors is in series between the LED array and the output of said rectifier to block the DC power; and
a second mode in which the junction and the LED array (LED1) are connected to the output of the rectifier thereby to allow the LED array to be powered by the DC power.

4. A retrofit LED tube as claimed in claim 3, wherein said control unit comprises a detection circuit for detecting the current flowing through the LED array or the current at the output of the rectifier, and is arranged to switch between the first and second modes according to said received input dimming level and the detected current.

5. A retrofit LED tube as claimed in claim 4, wherein said control unit is adapted to be controllable to switch between the first and second modes at a frequency of greater than 20 kHz, and at a duty cycle according to said received input dimming level and the detected current.

6. A retrofit LED tube as claimed in claim 1, wherein said rectifier comprises a full bridge diode rectifier, with a first AC terminal (A) and a second AC terminal (B), and a positive DC terminal and a negative DC terminal (C, D), wherein said positive DC terminal and said negative DC terminal are respectively adapted to connect to an anode and a cathode of the LED array (LED1), and wherein the switchable capacitor arrangement is provided in parallel with the first AC terminal and the second AC terminal, and the switch (S1) is connected between said positive DC terminal (C) or said negative DC terminal (D) and a corresponding electrode of the LED array.

7. A retrofit LED tube as claimed in claim 1, further comprising a dummy load (R3) and a smoothing capacitor (C5) each in parallel with the LED array.

8. A lighting system, comprising:
a high frequency electronic ballast; and
a retrofit LED tube as claimed in claim 1,
wherein the retrofit LED tube is connected to said high frequency electronic ballast.

9. A lighting system according to claim 8, further comprising a dimmer switch arranged for setting, by a user, an input dimming level, and arranged for transmitting said input dimming level to said dimming unit comprised by said retrofit LED tube.

10. A method of operating a retrofit LED tube, which is connected to a high frequency, HF, ballast, said retrofit LED tube comprising an LED array (LED1) for emitting light, a rectifier having two AC terminals (A, B) and two DC terminals (C, D), and a switchable capacitor arrangement, and arranged for introducing a capacitance to said connected HF ballast, wherein the method comprises:
receiving AC power from a connected HF ballast and using the rectifier to convert said AC power to DC power;
receiving an input dimming level; and
controlling switching of said switchable capacitor arrangement based on said received input dimming level, wherein the switchable capacitor arrangement comprises a switch (S1), at least a first capacitor (C3) and a second capacitor (C4), and said step of controlling comprises:
controlling said switch (S1) to switch an alternative one of the first capacitor and the second capacitor in series between an alternate one of the two AC terminals (A, B) of the rectifier and the LED array and cut off a connection of the LED array to one of the two DC terminals (C, D) thereby blocking the DC power to said LED array in opposing half cycles of the AC power;
wherein the first capacitor and the second capacitor have a junction between them, the step of controlling comprises switching the other one of the first capacitor and second capacitor in parallel with the other one of the AC terminals (A, B) and the series connection of the one of the first capacitor and the second capacitor and the LED array, and
wherein controlling the switching comprises switching between:
a first mode in which the junction and the LED array are isolated from the output of the rectifier such that the alternative one of the two capacitors is between the LED array and the output of said rectifier to block the DC power; and
a second mode in which the junction and the LED array are connected to the output of the rectifier thereby to allow the LED array to be powered by the DC power,
wherein during the first mode, allowing the one of the first capacitor and the second capacitor to discharge in one subsequent phase after the one of the first capacitor and the second capacitor is switched in series between an output of the rectifier and the LED array to block the DC power to said LED array in one phase.

11. A method as claimed in claim 10, comprising detecting the LED current or the output current of the rectifier, and switching between the first and second modes according to said received input dimming level and the detected current.

12. A method as claimed in claim 11, wherein said switching between the first and second modes takes place at a frequency of greater than 100 Hz, for example in the range 500 Hz to 1 MHz, and further comprising providing a dummy load and a smoothing capacitor each in parallel with the LED array.

* * * * *